Nov. 15, 1960   P. SPERGEL ET AL   2,959,932
DENSITY CONTROL APPARATUS
Filed Feb. 20, 1957   6 Sheets-Sheet 1

INVENTORS
Philip Spergel
and David A. Bossen
BY Anthony D. Cennamo
ATTORNEYS

Nov. 15, 1960
P. SPERGEL ET AL
2,959,932
DENSITY CONTROL APPARATUS
Filed Feb. 20, 1957
6 Sheets-Sheet 2
Fig. 3.
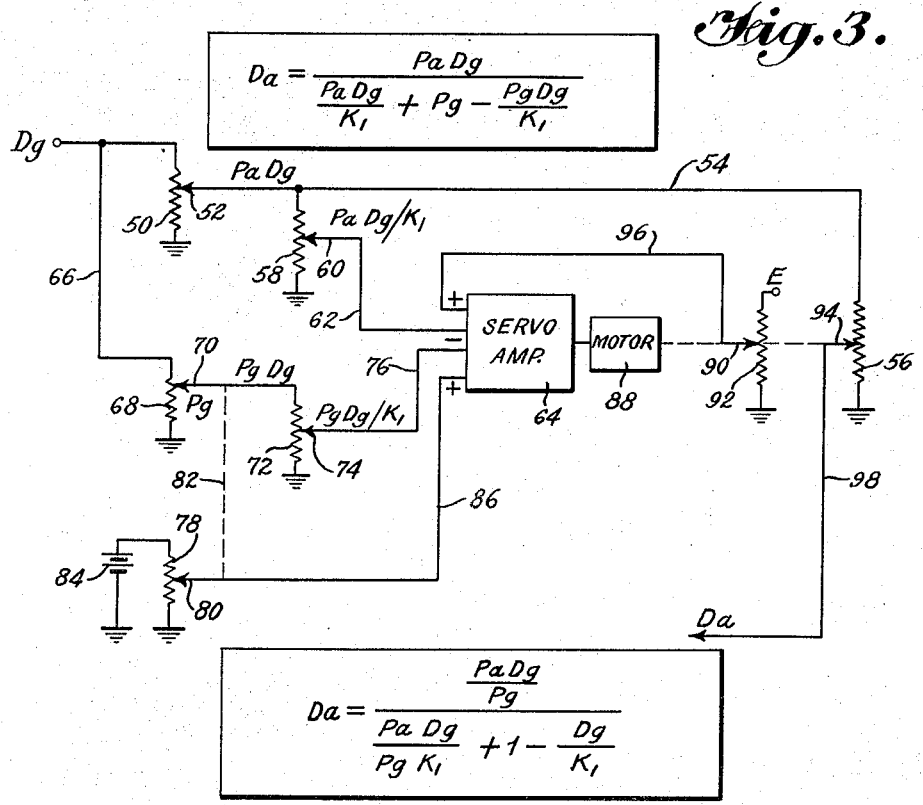
Fig. 4.
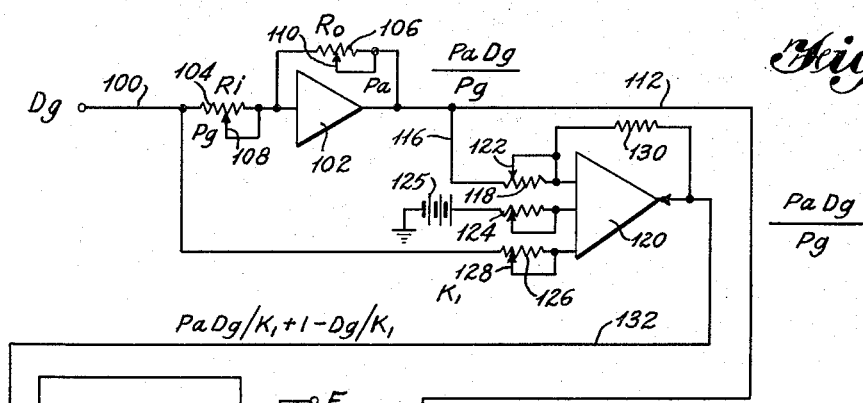
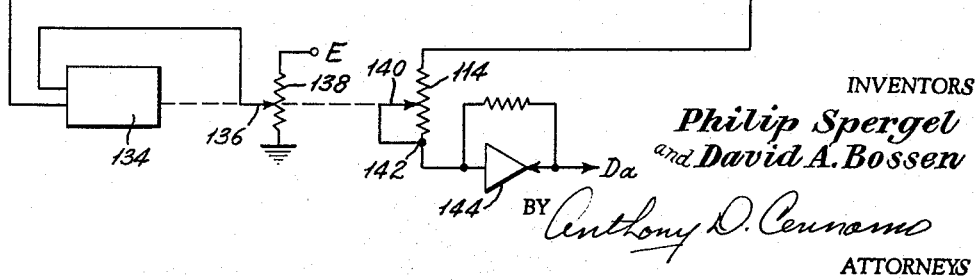
INVENTORS
*Philip Spergel*
*and David A. Bossen*
BY *Anthony D. Cennamo*
ATTORNEYS Nov. 15, 1960  P. SPERGEL ET AL  2,959,932
DENSITY CONTROL APPARATUS
Filed Feb. 20, 1957  6 Sheets-Sheet 3

$$Dg' = \frac{Pg\,Da'K_1}{Da\,Pg + Pa\,(K_1 - Da)}$$

INVENTORS
*Philip Spergel*
and *David A. Bossen*
BY *Anthony D. Cennamo*
ATTORNEYS

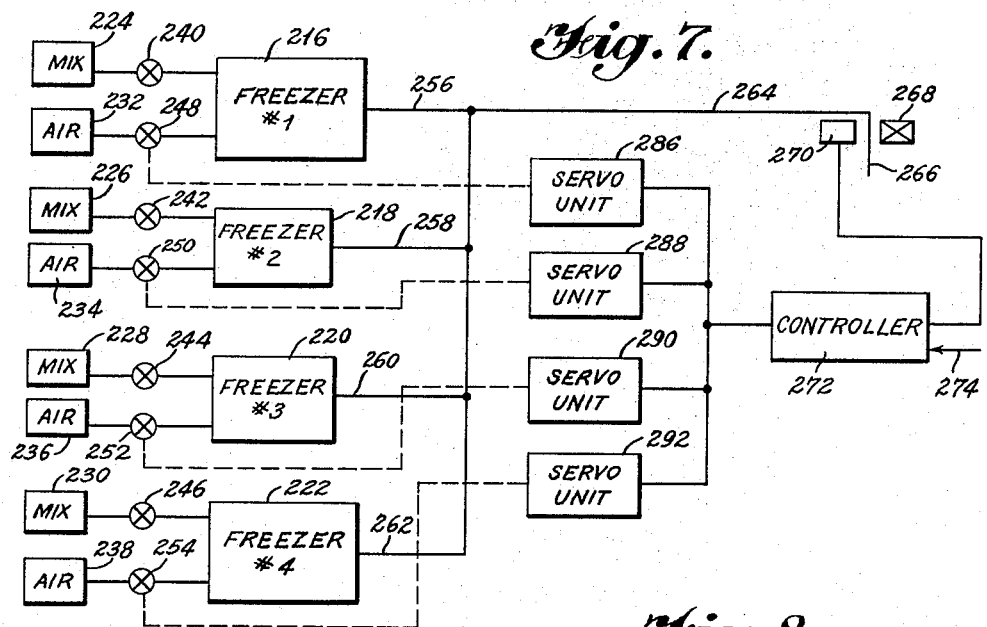
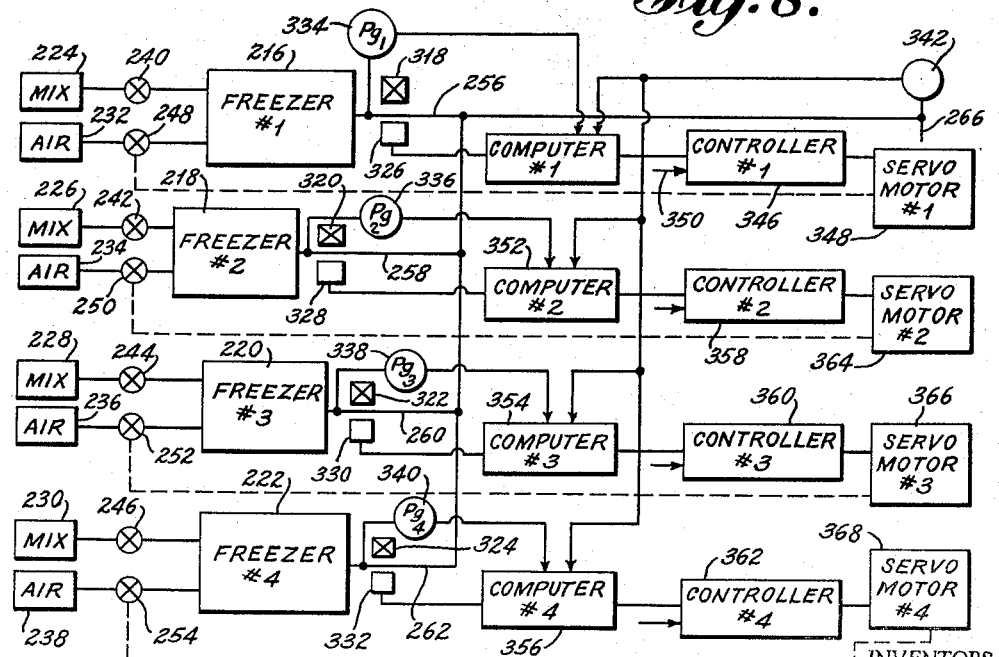

INVENTORS
*Philip Spergel*
and *David A. Bossen*
ATTORNEYS

Nov. 15, 1960 P. SPERGEL ET AL 2,959,932
DENSITY CONTROL APPARATUS
Filed Feb. 20, 1957 6 Sheets-Sheet 6
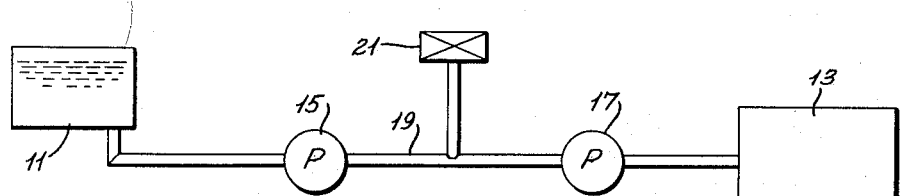
Fig. 12.
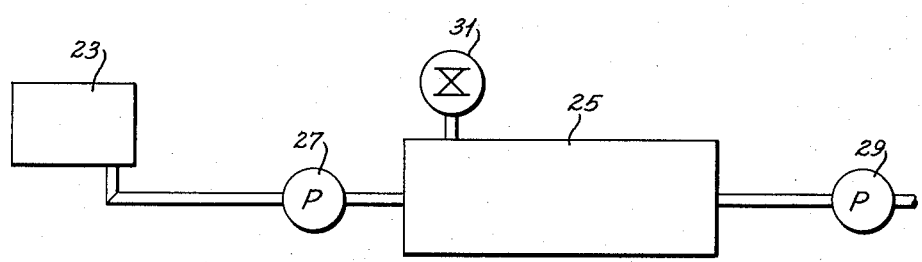
Fig. 13.
Fig. 14.
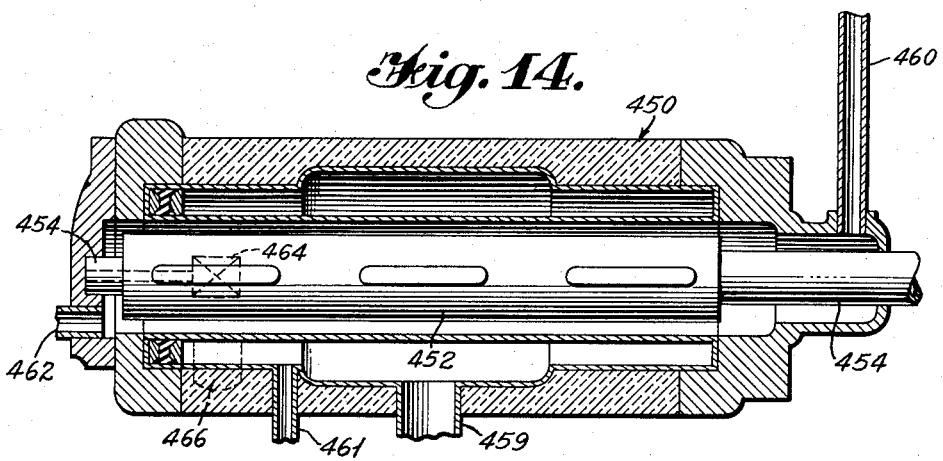
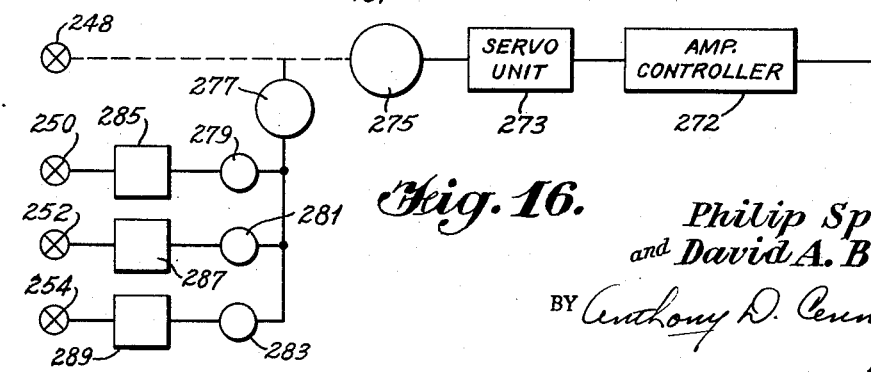
Fig. 16.
INVENTORS
Philip Spergel
and David A. Bossen
BY Anthony D. Cennamo
ATTORNEYS

United States Patent Office 2,959,932
Patented Nov. 15, 1960

2,959,932

DENSITY CONTROL APPARATUS

Philip Spergel and David A. Bossen, Columbus, Ohio, assignors to Industrial Nucleonics Corporation Filed Feb. 20, 1957, Ser. No. 641,303

30 Claims. (Cl. 62—136)

This invention relates to an apparatus for use in the manufacture or processing of a liquid mixed with a compressible fluid and more particularly relates to an apparatus for controlling ice cream density.

In all commercial ice creams, air is incorporated during the freezing operation so that the finished product will have the desired body and palatability. The amount of air thus incorporated is commonly known as "overrun." Deviations from a fixed overrun characteristic with a certain mix causes the body of the finished ice cream to be either too heavy or too light, and causes the texture to be either too coarse or too flaky. Variation in the amount of overrun in either direction generally has a deleterious effect upon palatability. If too little air is incorporated, the product is excessively cold in the mouth, its body heavy and its texture soggy. If too much air is incorporated the ice cream tends to be frothy and snowy.

The amount of air in ice cream is usually expressed as the volumetric percent of the liquid entering the freezer, and this percentage is termed the amount of "overrun." Thus 100% overrun means the addition of a volume of air at ice cream temperature, equal to the original volume of the liquid entering the freezer. At present, a measure of control is obtained by taking samples of ice cream, preferably at equal intervals of time, and measuring the air content of each sample. This is done by weighing a known volume of ice cream from the freezer spout. The weight of the same volume of the incoming liquid mix is also determined. Knowing the weights of identical volumes of liquid and the finished ice cream, the percent overrun may be computed. Following such a computation the valve on the air line supplying air to the freezer is adjusted manually to change the supply of air to the freezer in such a way as to correct the measured error in overrun.

This method of intermittent weighing and subsequent intermittent changes in air pressure supplied to the freezer is considered quite unsatisfactory by ice cream producers. The method is slow and gives no assurance of correctness of overrun between determinations, nor does it assure a rapid asymptotic approach to the required overrun by the repeated adjustment of the air valve following each overrun determination. As a result, certain automatic or semi-automatic systems for controlling overrun in ice cream machines have been proposed. According to one of these systems a pair of floats is utilized to provide respective indications of the mix density and of the density of the ice cream issuing from the freezer, and these indications are utilized to obtain an overrun signal. The overrun signal is utilized to actuate a controller for the air valve so as to provide continuous overrun control. While this system would seem an improvement over the older manual control methods certain rather basic difficulties have prevented its receiving any substantial practical use. Perhaps the most serious of these is the fact that it is difficult if not impossible to secure prompt or accurate response from a float in a fluid so viscous as frozen ice cream. Another of the more serious deficiencies in the system is the fact that pressure variations within the system introduce very substantial errors into the overrun computation.

A different approach to automatic control of overrun utilizes the conductivity of the ice cream to provide a control signal. Temperature compensation is necessary and this is accomplished either by means of an elaborate arrangement of bimetallic strips or by means of a complex electrode assembly mounted within the pipe carrying the ice cream. Aside from the fact that pressure variations upset the accuracy of control, this system necessitates the use of foreign electrode elements within the moving body of ice cream. Since ice cream is basically a milk product, sterilization is of considerable importance and the use of measuring or electrical elements within the body of moving ice cream presents difficult cleaning problems which to date have prevented such control systems from receiving any substantial acceptance by the ice cream industry.

A satisfactory ice cream density or overrun control system must satisfy a number of basic requirements. The control must be capable of maintaining a set density or overrun over relatively long periods of time without attention from an operator. The unit must be adapted to installation in existing ice cream manufacturing plants with an absolute minimum of modification of such installations and without introducing foreign or extraneous equipment or electrodes into the mix or ice cream circuit. The control unit must provide a substantially instantaneous density determination and should not be subject to error because of pressure or temperature variations. The system must possess a high degree of stability and should maintain its accuracy over relatively long periods of time. The installation must not interfere with normal cleaning procedures used in ice cream plants and should occupy a minimum of space in the vicinity of the freezer and piping.

We have now found that substantially all of the foregoing requirements may be met and a highly satisfactory control of ice cream density achieved through the use of a control system which utilizes a radioactive source and a suitable detector to provide a signal which is a function of ice cream density. Freedom from error due to pressure variation is provided and variations due to transit delay time are minimized. The design of the installation minimizes the modifications necessary in existing equipment and does not increase the existing problems of maintaining cleanliness and sterilization. The system is flexible and is capable of satisfactorily controlling either single or multiple freezer plants.

It is accordingly a primary object of the present invention to provide an improved system for furnishing a mixture of a liquid and a compressible fluid at a predetermined density.

It is another object of the present invention to provide an improved ice cream density control system.

It is another object of the present invention to provide an ice cream density control system whose accuracy of control is substantially unaffected by variations in pressure in the freezer or in the ice cream piping.

It is another object of the invention to provide an ice cream density control system adapted to installation in existing ice cream plants with a minimum of modification thereof and without deleteriously affecting or making more difficult the maintenance of sterile conditions.

It is another object of the invention to provide an ice cream density control system which utilizes a density transducer occupying a minimum of space and which needs no adjustment, cleaning, or attention over long periods of time.

It is still a further object of the invention to provide an improved ice cream density control system which is adapted to control either single or banked freezer plants.

These and further objects and advantages of the invention shall become apparent upon reference to the following specification and claims and appended drawings wherein:

Figure 3 is a schematic diagram of a computer suitable for use in the density control apparatus of Figure 2;

Figure 4 is a schematic diagram of another embodiment of a computer suitable for use in the control unit of the ice cream manufacturing apparatus of Figure 2;

Figure 7 is a diagramamtic showing of an ice cream manufacturing apparatus utilizing a bank of freezers and having density control applied thereto according to the invention;

Figure 8 is a diagram of an ice cream manufacturing apparatus utilizing a bank of freezers and having density control applied thereto according to another embodiment of the invention;

Figure 12 is a diagrammatic illustration of one commercial form of ice cream manufacturing plant;

Figure 13 is a diagrammatic illustration of another commercial form of ice cream manufacturing plant;

Figure 14 is an elevation, partly in section, of a freezer according to another embodiment of the invention;

Figure 16 is a diagrammatic illustration of another form of proportionate valve control.

Figure 1:
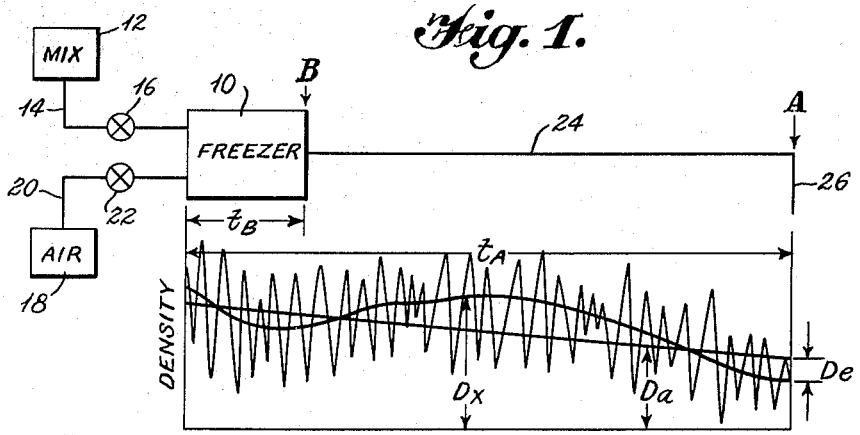
Figure 1 is a diagrammatic showing of the elements involved in the manufacture of ice cream including a graph showing density variations throughout the system.

Referring to Figure 1 the numeral 10 indicates a conventional ice cream freezer. Ice cream mix is fed to the freezer from a tank 12 through pipe 14 and valve 16. Air is fed into the freezer from a suitable source 18 through pipe 20 and valve 22. Ice cream from the freezer 10 passes through pipe 24 to a discharge spout 26 where the ice cream is packaged, stored or further processed. The pipe 24 may or may not be straight as indicated in the drawing and is meant to symbolize the piping between the freezer and the discharge spout.

The diagrammatic illustrated ice cream freezer plant of Figure 1 is used throughout this description for purposes of simplicity. It will be recognized by those skilled in the art that the control arrangements herein described may be used with equal facility in either of the two commercial systems shown diagrammatically in Figures 12 and 13.

In Figure 12 mix 11 is fed to freezer 13 through a pair of constant speed pumps 15 and 17. Pump 17 normally runs faster than pump 15 and air is drawn into the pipe 19 therebetween through a valve 21 which serves to control the amount of air admitted to the freezer. Valve 21 in Figure 12 thus corresponds to valve 22 in Figure 1.

In Figure 13 mix 23 is fed to freezer 25 through pump 27 and ice cream is removed therefrom by pump 29. Air is introduced directly into the freezer through valve 31 from a compressed air supply. Valve 31 in Figure 13 corresponds to valve 22 in Figure 1.

Referring to the graph shown in Figure 1, there is seen a theoretical plot of ice cream density against distance from the inlet of the freezer to the discharge spout. It will be noted that the average ice cream density $Dx$ varies all along the system above and below the density $Da$ which it is desired to maintain. This desired density $Da$ decreases as the ice cream advances through the system since the ice cream is under pressure until its discharge at atmospheric pressure. This decrease in desired or specification density may not be a straight line function as illustrated in Figure 1, but is illustrated in that form in the interest of simplicity.

If a density transducer is applied to the system substantially at the discharge spout 26 at A, under the conditions depicted in the graph of Figure 1, it will indicate that the density of the ice cream is low by an amount equal to $De$. If, however, the air supply to the freezer is decreased by an amount calculated to increase the density at the transducer by an amount equal to $De$, this correction would be applied at the input to the freezer where the density of the ice cream is not necessarily the same as it is at the spout, and in the particular example illustrated in Figure 1, where the density is already higher than the desired density $Da$. Thus in this particular instance the correction will only aggravate the situation.

This is obviously due to the fact that there is a delay equal to $t_A$ between the air injection which determines density and the measurement which controls the air injection. If the transducer is to remain at the discharge spout 26 some compensation for this time delay must be made and will be explained fully hereinafter. If the transducer is placed at the outlet of the freezer at B, rather than at the discharge spout at A, the time delay is reduced to $t_B$ and it is possible to correct shorter term variations in density than is possible with the transducer at A. We have found such a placement of the transducer to be highly desirable in certain installations. While the output 26 of the system shown in Figure 1 is referred to as a discharge spout, it will be clear that this can also be a connection to a further processing unit.

Figure 2:
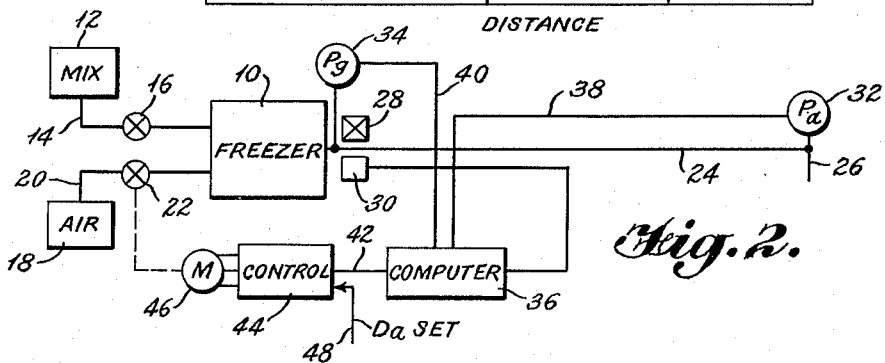
Figure 2 is a diagrammatic showing of an ice cream manufacturing apparatus having density control applied thereto according to the invention.

Referring to Figure 2, the ice cream manufacturing apparatus of Figure 1 is shown with a density control device of the present invention attached thereto. Identical units are identified by the same reference numerals as in Figure 1. A radioactive source 28 is constructed and positioned to direct a beam of penetrative particles or rays upon a radiation detector 30 adjacent the output of the freezer 10. The radioactive source 28 may be any suitable source of penetrating rays, for example, a source of gamma rays, which are emitted by an artificial radioisotope such as cesium-137. However, we prefer to use a special type of radiation source which is disclosed in a copending application SN 434,786, filed June 7, 1954 in the names of George B. Foster and Walter H. Canter, Jr.

The pipe 24 and the ice cream within the pipe intercept the beam of radiation emitted from the radioactive source 28, absorbing and scattering a certain amount of the radiation. The radiation detector 30 responds to any remaining radiation that has passed through the pipe and ice cream and may be any of the commonly used types of radiation detectors, such as Geiger-Müller tubes, ionization chambers, scintillation counters, or crystal detectors. While radioactive radiation sources are preferred X-ray sources may be used.

We have found that certain aperiodic and unpredictable variations in pressure occur within the ice cream piping system and that under certain circumstances these variations, if uncompensated, make accurate density control impossible. Thus while the pressure at the discharge spout 26 is generally atmospheric pressure, as indicated by the gauge 32, the pressure at the output of the freezer is in excess of this amount and tends to vary. This latter pressure is indicated by the gauge 34. While it is impossible to predict the fluctuations of pressure at the output of the freezer or the absolute value of such pressure, it is possible to compensate for the variation.

Assuming for the moment that the weight of the air in the mixture is negligible consider the following computations:
Where $Wm$ = weight of mix
$Vm$ = volume of mix
$Vag$ = volume of air at gauge pressure
$Pg$ = pressure of fluid mixture at gauge
$Vaa$ = volume of air at atmosphere pressure
$Pa$ = pressure of air at atmospheric condition
$Dg$ = density of ice cream at the position of the gauge
$Da$ = density of the ice cream at atmospheric pressure.

$$Dg = \frac{Wm}{Vm + Vag} \quad (1)$$

$$Vag = \frac{Wm}{Dg} - Vm \quad (2)$$

$$Da = \frac{Wm}{Vm + Vaa} \quad (3)$$

$$VaaPa = VagPg \quad (4)$$

$$Vaa = \frac{VagPg}{Pa} \quad (5)$$

Substituting Equation 2 in Equation 5:

$$Vaa = \frac{Pg}{Pa}\left(\frac{Wm}{Dg} - Vm\right) \quad (6)$$

Substituting Equation 6 in Equation 3:

$$Da = \frac{Wm}{Vm + \frac{Pg}{Pa}\left(\frac{Wm}{Dg} - Vm\right)} \quad (7)$$

$$Da = \frac{WmPaDg}{VmPaDg + PgWm - PgVmDg} \quad (8)$$

$$Da = \frac{PaDg}{\frac{Vm}{Wm}PaDg + Pg - Pg\frac{Vm}{Wm}Dg} \quad (9)$$

If, $$\frac{Wm}{Vm} = K_1 \quad (10)$$

then $$Da = \frac{PaDg}{\frac{PaDg}{K_1} + Pg - \frac{PgDg}{K_1}} \quad (11)$$

Turning again to Figure 2, the output of detector 30, which gives an indication of density at gauge pressure, is fed to a computer 36 which receives a pair of pressure proportional inputs over lines 38 and 40 from transducers connected to the pipe 24 at the points of connection of gauges 32 and 34. The computer is suitably connected to solve Equation 11 and provides at its output 42 a signal which is a function of the density of the ice cream at atmospheric pressure. This signal is fed to an amplifier controller 44 which controls a servo motor 46 connected to operate the air valve 22. The operating point of the amplifier controller 44 is set by means of a $Da$ (density in air) setting control 48. The detector 30, computer 36, amplifier controller 44, servo motor 46 and valve 22 constitute a closed loop control system, as will be apparent to those skilled in the art.

Referring to Figure 3 there is shown a circuit diagram of one type of computer satisfactory for use in the system of Figure 2 for solving Equation 11. Referring to that figure, the output of the detector 30, which is here referred to as $Dg$, is fed to a potentiometric multiplier 50 whose movable contact 52 is rotated proportionately to atmospheric pressure $Pa$, either manually or through a suitable servo mechanism in the circuit 38 of Figure 2. Since potentiometer 50 is linear, the voltage between the variable contact 52 and ground is directly proportional to the angle of rotation of the potentiometer shaft so that the open circuit voltage at the movable contact is equal to $PaDg$. This $PaDg$ term is fed over connection 54 to an inverse function potentiometer 56 which has its lower end grounded.

The term $PaDg$ on line 54 is also connected to a further potentiometric multiplier 58 whose movable contact 60 is set at a position proportionate to $1/K_1$. The line 62 from potentiometer 58 thus carries the term $PaDg/K_1$ to the input of a servo-amplifier 64. The input $Dg$ from the detector 30 is also fed over line 66 to a further potentiometric multiplier 68 whose movable arm 70 is rotated in proportion to the pressure of gauge 34, either manually or by means of a suitable transducer and servo mechanism connected in the line 40 in Figure 2. The output of potentiometer 68 is equal to $PgDg$ and this is fed to a further potentiometric multiplier 72. The movable contact of potentiometer 72 is set proportionately to $1/K_1$, as was potentiometer 58, and the output is connected over line 76 to the servo-amplifier 64. This output constitutes the term $PgDg/K_1$. A further potentiometer 78 has its movable arm 80 rotated in proportion to $Pg$, as by means of a link 82 to potentiometer 68. Potentiometer 78 is connected to a battery 84 or other source of potential, and provides the term $Pg$ on line 86 which feeds into the servo-amplifier 64.

The inputs on lines 62, 76 and 86 are fed to a suitable adding network within the servo-amplifier 64 so that the signals on lines 62 and 86 are given positive signs, while that on line 76 is given a negative sign. Servo-amplifier 64 is connected to a suitable servo motor 88 which drives the movable arm 90 of a further potentiometer 92 connected to a voltage source E. The motor 88 also drives the arm 94 of inverse potentiometer 56 and the arm 90 of potentiometer 92 is returned to the input of servo-amplifier 64 by means of connection 96. The servo-amplifier 64, motor 88 and potentiometers 92 and 56 constitute a conventional servo-multiplier which, when utilized with an inverse potentiometer 56, performs a potentiometric division. That is to say, it will be apparent to those skilled in the art that the shafts of both potentiometers 92 and 56 rotate proportionally to the divisor in Equation 11. Potentiometer 56, being an inverse function potentiometer, is wound so that, as its shaft rotates in proportion to the value of the divisor, the output voltage of the potentiometer is proportional to the reciprocal of the shaft rotation. Since the voltage on the potentiometer is equal to $PaDg$ the output on line 98 is equal to $Da$.

Referring again to Figure 2 this $Da$ output is fed to the servo controller 44 which receives a $Da$ set signal from input 48 to produce an error voltage which controls the valve 22. By placing the density detector at the freezer output the transit delay error is also minimized. Pressure variations continue to occur but are accurately compensated by the computer 36 which transforms the density at these variable pressures to density at atmospheric pressure. Inasmuch as atmospheric pressure is normally not a rapidly varying parameter a transducer at this point may be dispensed within certain installations and an atmospheric pressure input adjusted into computer 36 periodically upon reading a suitable atmospheric pressure gauge or barometer. The pipe line pressure at the position of detector 30 can also be manually set into computer 36, although the rate and random nature of this pressure variation at the output of the freezer generally make this type of Pg input somewhat difficult.

Turning to Figure 4 there is shown an alternative computer for supplying Da information to the servo controller 44. Equation 11 can be written as:

$$Da = \frac{PaDg/Pg}{\frac{PaDg}{PgK_1} + 1 - \frac{Dg}{K_1}} \qquad (12)$$

The Dg signal from the detector 30 is fed over line 100 to an operational amplifier 102 having conventional input and feed back resistors Ri and Ro. As is known when the amplifier loop maintains the amplifier input terminal at essentially ground potential there is no current drain into the amplifier and consequently the amplifier output is equal to $$\frac{Ro}{Ri} E \text{ input}$$

In Figure 4 the resistor Ri is shown as a potentiometer 104 while the resistor Ro is shown as a potentiometer 106. The movable arms 108 and 110 of these potentiometers are connected to short circuit respective ends thereof and are rotated proportionately to Pg and Pa respectively in the same manner as these variables operated potentiometers in the embodiment of the invention shown in Figure 3. This being the case, the output of operational amplifier 102 is equal to $PaDg/Pg$ and this is fed over line 112 to a potentiometer 114.

The output from line 112 is also fed through line 116 to a potentiometer 118 which forms one input resistor for a second operational amplifier 120. The movable arm 122 of potentiometer 118 is connected to short circuit one end of the potentiometer and the shaft is rotated in proportion to $K_1$. A second input to the operational amplifier 120 is provided through a second potentiometer 124 connected to a battery 125 and adjusted to provide an amplifier input to serve as the term 1 in the denominator of Equation 12. A third input is supplied to amplifier 120 through a third potentiometer 126 which receives a Dg input from line 100 and whose movable arm 128 is rotated in proportion to the reciprocal of $K_1$. Amplifier 120 is provided with a feedback loop resistor 130 and the output of the amplifier is the denominator of Equation 12 or $$\frac{PaDg}{PgK_1} + 1 - \frac{Dg}{K_1}$$

This is fed over line 132 to a servo-amplifier and motor 134 which moves the movable contact 136 of a potentiometer 138 in proportion to this denominator term. The output of the servo-amplifier and motor 134 also drives the movable arm 140 in potentiometer 114 and this arm is connected to the lower end of the potentiometer 142. This point serves as an input to a further operational amplifier 144. Inasmuch as the voltage input to potentiometer 114 is equal to the numerator in Equation 12, while the resistance of potentiometer 114 in the input circuit of operational amplifier 144 is varied proportionally to the denominator in Equation 12, the output of operational amplifier 144 is equal to Da.

Figure 5:
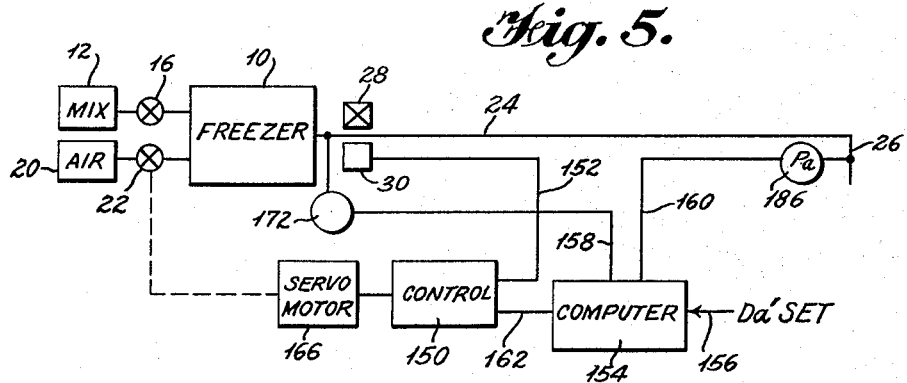
Figure 5 is a diagrammatic view of an ice cream manufacturing apparatus having another embodiment of the density control device of the invention applied thereto.

Referring to Figure 5 there is shown another embodiment of a control system associated with an ice cream manufacturing apparatus of the same type as shown in Figures 1 and 2. Similar reference numerals are used throughout to designate similar units. In this embodiment of the invention the output from the detector 30 is fed into a servo controller 150 through line 152. A further input to the servo controller 150 is provided from a computer 154 whose input at 156 is the set signal of desired ice cream density at atmospheric pressure. The gauge pressure Pg at the position of source 28 and detector 30 and the atmospheric pressure Pa at discharge spout 26 are detected by suitable transducers and are fed into computer 154 over lines 158 and 160. As pointed out hereinabove these inputs may be fed in manually if desired. The output of computer 154 is the solution of equation 11 for desired ice cream density at gauge pressure as follows:

$$Dg' = \frac{PgDa'K_1}{DaPg + Pa(K_1 - Da)} \qquad (13)$$

The Dg' term from computer 154 is fed into servo controller 150 over line 162 and with the signal fed from the detector through line 152 provides an error signal which controls servo motor 166 coupled to the air valve 22.

Figure 6:
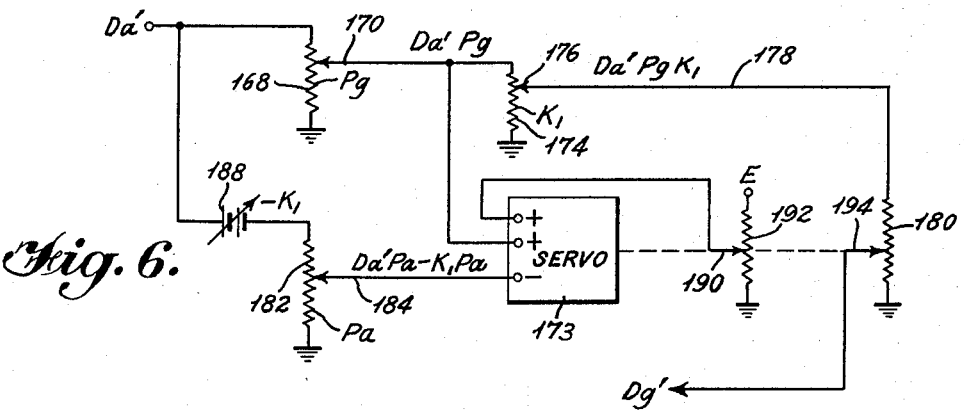
Figure 6 is a schematic diagram of a suitable computer for use in the controller of the ice cream manufacturing apparatus of Figure 5.

A suitable computer for solving Equation 13 is shown in Figure 6. Referring to this figure, the signal from the Da' set control 156 in Figure 5 is fed to a first potentiometric multiplier 168 having a movable arm 170 rotated proportionately to Pg which is detected by a transducer 172 in Figure 5. The output from movable arm 170 is thus equal to Da'Pg and this is fed as one input to a servo-amplifier and motor unit 172. The signal at the movable arm 170 of potentiometer 168 is also fed to a further potentiometric multiplier 174 having a movable arm 176 rotated proportionately to $K_1$ to produce the term Da'PgK₁ on the line 178. This line is connected to a grounded potentiometer 180 which is of the inverse function type.

The servo-amplifier 173 is provided with a further input from a potentiometric multiplier 183 having a movable arm 184 rotated proportionately to Pa as determined by transducer 186 in Figure 5. The input to potentiometer 182 is supplied from the Da' signal source through a battery 188 which provides the $-K_1$ term. The output on movable arm 184 of potentiometer 182 is thus $PaDa' - K_1Pa$. The signal on line 170 is given a + sign in the amplifier 173 and the signal on line 184 is given a — sign. The input to servo amplifier 173 is thus the denominator in equation 13. The motor of the servo unit 173 controls the shaft and movable contact 190 of a potentiometer 192 and also controls the movable arm 194 of inverse function potentiometer 180. The output from this movable contact 194 is equal to Dg' by means of a division performed in the manner discussed in detail in connection with the computer circuit shown in Figure 3.

In all embodiments of the invention the radiation from the source is directed through the pipe containing the ice cream toward the detector and, in its passage through the pipe and ice cream, it loses more or less of its energy, dependent upon the number of electrons per unit volume in the material in its path. Thus density, the variable which it is desired to control, directly controls the amount of radiation reaching the detector 30 and by means of a simple calibration the detector can be made to yield a signal which is sensitive function of density. Since the absorption coefficient for the material of the pipe which contains the ice cream is considerably higher than the absorption coefficient of the ice cream itself, certain precautions must be taken to insure adequate sensitivity and accuracy. While it might be possible to stagger the position of a radiation source and of a radiation detector along the length of a pipe, so as to increase relative changes in radiation absorption for given density changes in the material within the pipe, we have found that this particular expedient is subject to certain disadvantages. Generally speaking, the equipment mounted near the piping of ice cream machines must frequently satisfy somewhat stringent space limitations making this staggered arrangement impractical. Such an arrangement also necessitates a relatively large quantity of radioactive material with the radiation extending over a lengthy span and creating a shielding problem.

When the density of the ice cream is higher its absorption coefficient is also higher, and we have found that greater sensitivity and accuracy may be achieved when the source and detector are placed in the system at a high pressure position. In addition to this accuracy and sensitivity are improved if the ratio of the mass of the material through which the radiation passes to the mass of pipe through which it passes is kept high. This can be accomplshed through the use of tin wall pipe or through the use of a pipe having a lower absorption coefficient, such as plastic pipe. In the latter instance care must be exercised to select a rigid resin pipe so that variations in pipe shape do not modify the geometry of the system. Glass reinforced pipes may be used for this purpose.

Figure 11:
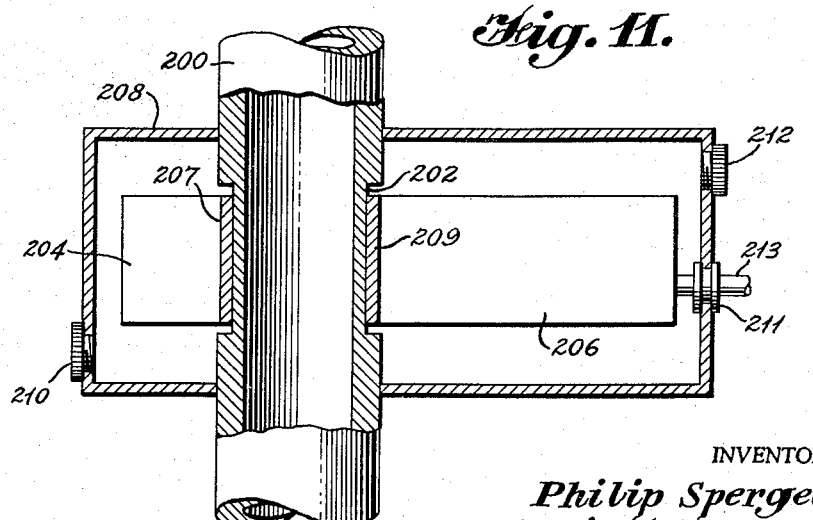
Figure 11 is a vertical cross section showing the radiation source and detector units applied to the ice cream conduit or pipe.

While thin pipes or low absorption coefficient pipes may be used we have found that a very sensitive and accurate control signal may be obtained if the source and detector are applied in a particular manner to a standard section of pipe 200 which needs no special fittings. Referring to Figure 11 there is shown a standard pipe 200, preferably of stainless steel, to which the source 204 and detector 206 are attached. In order to reduce the radiation absorption within the walls of the pipe we mill a reduced diameter portion 202 into the pipe and mount the source 204 on one side thereof and the detector 206 on the other side. Low absorption coefficient layers of insulation 207 and 209 are placed between the source 204 and detector 206 and the pipe in order to minimize the effects of temperature changes upon these units.

By using this arrangement of a necked down standard pipe completely standard fittings may be utilized and conventional plumbing tools used for the installation. The milling can be performed either after the location of the source-detector unit in a given installation has been decided upon, or standard length pre-milled pipe sections can be provided. In either case an absolute minimum of expense is entailed and no maintenance or special precautions are necessary.

We have also found that in using a radiation source and detector in connection with ice cream plant pipes, condensation tends to build up on the outer surface of the pipe to cause uncompensated absorption which introduces error into the control. Where the temperature is sufficiently low this condensate freezes and the phenomenon is cumulative. In order to eliminate this we have found that it is desirable to mount the portion of the pipe to which the source 204 and detector 206 are attached in a sealed container 208 which contains dry air or other gas. The gas in this container may be kept dry by flowing dry gas therethrough or the container may be hermetically sealed. In this last instance the moisture is preferably driven out of the container 208 prior to sealing and suitable supply and exhaust ports 210 and 212 may be supplied for this purpose. A dessicant may be employed within the container but this is generally unnecessary if the gas is once dried and the container sealed. A suitable dryness indicator may be provided to prevent a gradual build-up of moisture within the container with concomitant gradual build-up of error in the control. A sealed outlet 211 for cable 213 is provided. While the source 204 and detector 206 are shown as clamped directly to the necked down section of the pipe 200 over insulating pads 207 and 209 in Figure 11, it will be understood that these units need not be in direct contact with the pipe but may be spaced a small distance therefrom.

In many instances an ice cream manufacturing plant comprises a bank of freezers feeding a common supply pipe. The freezers may or may not be of the same size and may be cut in and out of the system as the load demands. Referring to Figure 7 there is shown one method of applying the control system of our invention to banked freezers. A plurality of freezers 216, 218, 220 and 222 are provided with mix supply tanks 224—230, air supply sources 232—238, mix supply valves 240—246, and air supply valves 248—254. The freezers, which all may be of different sizes, discharge through separate discharge pipes 256—262 into a common feed pipe 264 which terminates in discharge spout 266. It will be apparent of course that all freezers in certain installations may be of the same size or that some of the freezers in an installation may be of the same size.

In this embodiment of our invention a source 268 and detector 270 are mounted adjacent the discharge spout 266 and the detector 270 is connected to a suitable amplifier controller unit 272. Since the pressure of the ice cream at the discharge spout is substantially atmospheric, the signal from the detector 270 is a direct measurement of density at atmospheric pressure. As a consequence an atmospheric density set signal can be fed into the amplifier controller at 274 to produce an error signal to be used in controlling the air supply. The output of amplifier controller 272 is fed to servo units 286—292 which respectively actuate the air valves 248—254 associated with freezers 216—222.

Since each of the freezers may be of a different size, the air valves must be adjusted in different amounts for any given error signal. In addition to this valve response in machines of identical size is frequently different. In order to compensate for this, scale changing amplifiers and suitable reduction gears are provided, although other proportion adjusting means may be utilized. That is to say, mechanical means may be used or other electrical circuitry may be resorted to so long as the air supply to each freezer responds proportionately to an error signal in ice cream density at atmospheric pressure.

Figure 15:
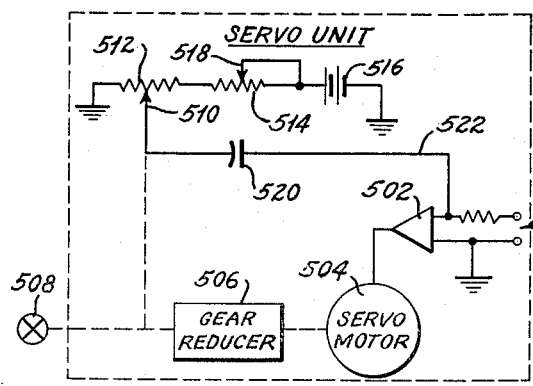
Figure 15 is a diagrammatic illustration of a form of proportionate valve control.

Referring to Figure 15 there is shown schematically an example of an integrating servo unit which may be utilized in the system of Figure 7. The error signal from controller 272 may be fed to a servo amplifier 502 which drives a servo motor 504. The motor 504 drives valve 508 through reduction gears 506. The valve 508 corresponds to any one of the air valves 248—254 in Figure 7. The output shaft of gear reducer 506 is also coupled to the variable tap 510 of a potentiometer 512 in the network which includes a unidirectional voltage source represented by the battery 516 and potentiometer 514. The arm 510 of potentiometer 512 is coupled back to the input of the servo amplifier 502 through capacitor 520 and line 522.

Those skilled in the control art will recognize the circuit of Figure 15 as a conventional velocity servo system which will automatically effect the positioning of valve 508 in proportion to the time integral of the input error signal. The amplifier 502 has a practically infinite forward gain and will saturate on a very low D.C. input voltage. When any error voltage from amplifier controller 272 appears at the input of the servo unit, the servo motor 504 will start under full acceleration to drive the valve 508 through gear reducer 506 in a direction so as to correct the process error observed by the amplifier-controller 272. Since the arm 510 of potentiometer 512 is also driven simultaneously with valve 508, a changing potential is applied to capacitor 520. This results in a potential on line 522 whose magnitude depends on the angular rate of change of the valve position, and whose polarity is in a direction to oppose the error signal at the input of the servo unit. The motor will continue to accelerate until it has attained a velocity of rotation such that the feedback voltage on line 522 is equal and opposite to the error signal voltage, at which time the input to the servo amplifier 502 is reduced to zero. If the motor attains a speed such that the feedback voltage on line 522 exceeds the error signal voltage, the polarity of the voltage at the input to the servo amplifier 504 is reversed. At this time the power delivered to the motor 504 by the servo amplifier 502 is applied in a manner such that the motor will tend to drive in the opposite direction. It can be seen that by this mechanism the speed of the motor is automatically regulated to maintain its velocity proportional to the magnitude of the D.C. error signal from amplifier-controller 272. It is apparent also that if this error signal has the opposite polarity, indicating a deviation of ice cream density in the opposite direction from the set value, the motor will reverse and adjust the air valve in the opposite direction.

Since the speed of corrective rotation of the air valve is proportional at any given instant to the error signal, and the error signal is continuously bucked out by an equal and opposite null feedback voltage which is substantially proportional at the same instant to $$\frac{de}{dt}$$

the derivative of the valve position angle with respect to time, the net rotation of the valve over any given time period is proportional to the integral of the error signal voltage over the same time period.

The proportionality constant or "gain" of the system, that is, the correction rate per unit error in the measured density of ice cream is individually predetermined for each freezer in a controlled bank such as the group 216—222 in Figure 7. A mean value for this constant is employed in selecting the particular gear ratio used between the servo motor 504 and the valve 508. Potentiometer 514 in Figure 15 illustrates one method of providing an adjustment for conveniently varying the gain to suit the control requirements of the individual air valve. Such an adjustment is necessary to allow each servo unit of the controller to be "trimmed" for optimum performance of each freezer in the bank in relation to other freezers in the group. The adjustment is further necessitated by the fact that the air valves normally require periodic disassembly for cleaning, which operation often alters the flow characteristics of the valve. By means of the shorting wiper 518 on potentiometer 514, it is possible to vary the voltage across potentiometer 510, thereby altering the velocity of the motor 504 which will be maintained for a given error signal.

It will be apparent to those skilled in the art that the rate-signal feedback on line 522 may be obtained in an equivalent manner by means of a suitable tachometer generator driven by the servo motor 504.

The maximum permissible gain of the control system in Figure 7 is limited primarily by transportation lag, that is, the length of time required for the effect of a step change in the air valve position to be observed at the gauging head. If the gain, or correction rate, is set too high, over-correction results and the process is caused to "cycle" or perform forced oscillations around the desired ice cream density. On the other hand, the more it is necessary to reduce the system gain to compensate for transportation lag, the more sluggish and inefficient is the control action.

Referring to Figure 8 there is shown another embodiment of our control system applied to bank freezers of the same type shown in Figure 7. The freezers, mix and air supplies in Figure 8 are identical with those in Figure 7 and similar reference numerals have been applied to similar units. In this embodiment of the invention the source units 318—324 and detectors 326—332 are applied to the freezer discharge pipes 256—262 immediately adjacent the output of the freezer thereby minimizing delay time but making pressure compensation desirable. Pressure transducers 334—340 are connected to the discharge pipes 256—262 immediately adjacent the output of each individual freezer and a similar pressure transducer 342 is attached to the discharge spout 266.

The output of detector 326, which is a measure of density at gauge pressure, is fed to a computer 344 which receives inputs from transducers 334 and 342. The computer 344 supplies an output (D$a$) which is a measure of ice cream density at atmospheric pressure and this signal is fed into a suitable amplifier controller 346 which controls servo motor 348. The servo motor 348 is mechanically connected to the air valve 248 to effect control of the density of the ice cream issuing from freezer 216. The computer 344 may be similar to those shown in Figures 3 and 4 and provides a signal which may be matched with a density at atmospheric pressure set signal (D$a$) fed into the controller at 350 to provide an error signal for controlling the servo motor. The signals from the remaining detectors 328, 330 and 332 are similarly fed to computers 352, 354 and 356 which receive inputs from transducers 336, 338 and 340 and from atmospheric pressure transducer 342. The output of computers 352, 354 and 356 are respectively fed to amplifier controllers 358, 360 and 362 and to servo motors 364, 366 and 368 controlling air valves 250, 252 and 254 associated with freezers 218, 220 and 222 respectively. The control system shown in Figure 8 permits somewhat more accurate control than that shown in Figure 7 in that sensing occurs at the output of the freezers so that delay time errors are reduced and because of the higher density of the ice cream at this point, sensitivity is somewhat improved. On the other hand, this particular system utilizes considerably more equipment than that shown in Figure 7.

Figure 9:
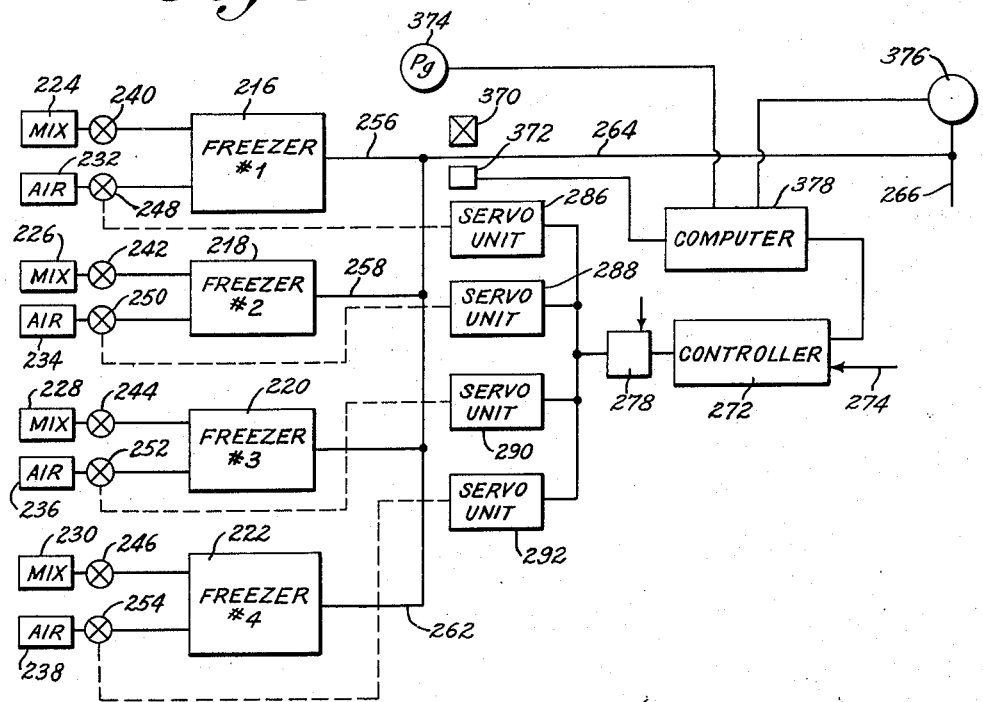
Figure 9 is a diagrammatic showing of an ice cream manufacturing apparatus consisting of a bank of freezers having density control applied thereto according to still a further embodiment of the invention.

Referring to Figure 9 there is shown a still further embodiment of a control system according to the invention which incorporates certain of the advantages of the system of Figure 8 while utilizing a smaller amount of equipment. The freezer, mix and air supply units in Figure 9 are identical with those in Figures 7 and 8 and similar reference numerals have been used to designate similar units. In this embodiment of the invention the source 370 and detector 372 are located on the common feed pipe 264 as close to the freezers as possible. That is to say, the sensing unit is mounted on the feed pipe 264 at the point where the individual feed pipes 256—262 of the individual freezers are joined together. A pressure transducer 374 is also provided at this point and a further pressure transducer 376 is provided at the discharge spout 266. The output of detector 372 is fed into a computer 378 similar to those shown in Figures 3 and 4 and signals from the transducers 374 and 376 are fed into this computer. The output of the computer, which is a density at atmospheric pressure signal D$a$, is fed into an amplifier controller 272 and compared with a D$a$ set signal at 274. The output of the controller 272 is fed to servo units 302—308. The servo units 302—308 respectively control air supply valves 248—254. This particular control system provides for density sensing closer to the freezers than at the discharge spout thereby minimizing delay difficulties, provides for density sensing at a relatively high pressure level thereby improving sensitivity, yet does not require an excessive amount of equipment. The computer 378 is common for all servo motors as is the controller 272.

Figure 16 shows an alternate method of achieving banked freezer control which may be utilized in either the system of Figure 7 or that of Figure 9. In this case, instead of using a plurality of servo units such as is exemplified in Figure 15, a single servo unit may be used to adjust all freezers in the group. Here the output of the servo unit 273, which readjusts the air valve 248 of one of the largest freezers in the bank, is also coupled to a selsyn transmitter 277. A plurality of selsyn receivers 279, 281, and 283 are connected to selsyn transmitter 277 and drive valves 250, 252 and 254 respectively through variable ratio speed changers 285, 287 and 289. A miniature speed changer suitable for this application is manufactured and marked by Metron Instrument Co., of Denver, Colorado.

Figure 10:
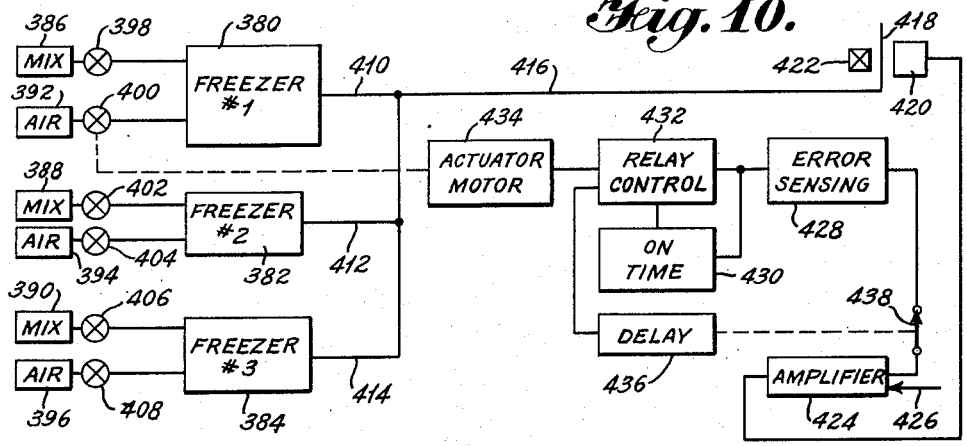
Figure 10 is a diagrammatic showing of an apparatus for manufacturing ice cream comprising a bank of freezers having density control applied thereto according to a still further embodiment of the invention.

Referring to Figure 10 there is shown still another embodiment of our invention applied to banked freezers 380, 382 and 384. Suitable mix supply tanks 386, 388 and 390 and suitable air supply sources 392, 394 and 396 supply mix and air to the freezers 380, 382 and 384 through valves 398—408 respectively. The outputs of freezers 380, 382 and 384 are connected through pipes 410, 412 and 414 to a common feed pipe 416 which terminates in a discharge spout 418. A sensing unit consisting of a radiation source 420 and detector 422 is provided at the discharge spout 418. The signal from the detector 422 is fed to a suitable amplifier controller 424 where it is compared with a Da set signal at 426 to provide an error voltage. This error signal is fed to both an error sensing device 428 and an on time determining device 430.

The error sensing device may be a contact meter, polarized relay, or electronic switch which closes one electrical contact if the error is in the opposite direction. This sensitive relay system provides the power to operate the heavier relays in the relay control section 432, which in turn apply power to the actuator motor 434 which adjusts the valve 400.

In this case a reset system of control is used. That is, for each correction applied the actuator motor 434 operates for only a short interval of time determined by the on time circuit 430 so that the amount of each correction is proportional to the magnitude of error in the density as measured by the gauge.

In the on time circuit, which may be a form of electronic timer, the error voltage may be rectified by a full-wave rectifier and used to charge a capacitor whose negative terminal is connected to the grid of a thyratron relay control tube. When power is applied to the actuator motor 434 to start an adjustment to the valve 400, a resistance is connected across the capacitor through which the capacitor may be discharged to the point where the thyratron tube is able to fire, actuating a relay which causes the corrective action to cease. Since the initial voltage on the capacitor depends on the magnitude of the error signal, the time required for the voltage on the grid of the thyratron to be reduced to the firing point produces a correction time proportional to the error signal.

Inasmuch as the relay and timing circuits described so far in connection with Figure 10 are of a type well known in the art, a more detailed description than the above is believed to be unnecessary.

Once a corrective adjustment to the air valve has been made a second correction is not permitted until the gauge is able to "see" the results of the first correction, which do not appear at the measuring head until the end of the transportation lag period. Accordingly, the delay device 436 is provided.

In the case where the rate of ice cream discharge from the spout is relatively constant, the delay device 436 may be an electric reset timer which is energized at the end of a corrective adjustment to the air valve. During its timing cycle, this timer may disconnect the output of the amplifier 424 from the error sensing 428 and on time 430 circuits as by opening the switch 428, preventing further corrective action regardless of the presence of an error signal. The timer 436 is set to run for the duration of the transportation lag period. At the end of the timing period the control is reactivated when the timer recloses switch 438. The timer then automatically resets itself to await the end of the next correction.

A suitable timer which may be readily incorporated in the circuits described is manufactured and marketed under the trade name Microflex by the Eagle Signal Corporation of Moline, Illinois.

In the case where the ice cream is discharged from the spout at a variable rate or intermittently, a timer may be unsatisfactory as a delay device, since transportation lag time is not constant. Hence the delay must be determined by the discharge of a specific quantity of ice cream from the spout. Accordingly, a suitable flowmeter may be employed to open and close a set of electrical contacts each time a specified quantity of ice cream has passed through the pipe, thus determining the proper delay for a variable speed process.

Often the expedient of employing a flowmeter device is objectionable, primarily due to the fact that any extra appurtenance of this type inserted in the process line adds to the problems of cleaning and the maintenance of proper sanitation. In the majority of cases, this expedient can be dispensed with entirely, since the spout 418 terminates in an automatic packaging machine where the ice cream is discharged into cans or cartons of specific volume.

Accordingly a feeler switch may be placed on the output of the filling machine to open and close a set of electrical contacts each time a package issues from the machine. Electrical impulses from this switch are utilized by the delay device 436, which in this case is a suitable electric reset counter such as is manufactured and marketed under the trade name Microflex above referred to. At the end of a correction period this counter is energized and will keep the controller inoperative until a pre-set number of impulses corresponding to cartons of ice cream has been accumulated on the counter.

A suitable control system of the type described and shown in Figure 10 is manufactured and marketed by Industrial Nucleonics Corporation of Columbus, Ohio, as the AccuRay Mark II-B Controller.

In this embodiment of our invention freezers 382 and 384 are allowed to run without automatic control while the largest freezer in the bank 380 is controlled to provide uniform density ice cream at the discharge spout 418. It will be apparent that in certain instances the control unit will cause the controlled freezer 380 to produce ice cream which is either above or below the desired ice cream density since the ice cream from this particular freezer must correct low or high density ice cream from the remaining freezers in the bank. This system provides an economical control installation.

Referring to Figure 14 there is shown another embodiment of our invention wherein the error due to transportation lag is reduced to an absolute minimum. A freezer 450 having a dasher 452 is provided with a dasher shaft 454 which is at least partially hollow. A mix and air inlet conduit 460 is provided at one end at the freezer while an ice cream outlet conduit 462 is provided at the other end of the freezer. Suitable refrigerant flow conduits 459 and 461 are provided.

According to this embodiment of the invention a suitable radioactive source 464 is mounted within hollow shaft 454 and dasher 452 and its radiation is detected by a detector 466. The spacing between source 464 and the point of air introduction of course determines the transportation lag and the minimum permissible spacing is determined by the distance the mixture must travel before it achieves a reasonable degree of homogeneity. Generally some spacing is necessary between the source 464 and the inlet. This type of apparatus may be incorporated in a system of the type shown in Figure 2.

It will be apparent from the foregoing that we have provided a system for controlling ice cream density which is accurate, capable of easy installation on existing freezers or banks of freezers, and capable of long term unattended operation.

While this invention has been described in connection with an ice cream process control system it is to be understood that its use is not limited thereto but is equally advantageous for use in other process control. Thus the control system of the invention may be used with butter processing installations or in foam rubber processing installations. Pressure compensation is of considerable importance in such systems and the process and apparatus of the invention are highly effective in such environments. Where pressures are higher than those encountered in ice cream freezing systems the weight of the compressible fluid cannot be neglected as was done in deriving Equation 11. In such instances the proper equation is as follows, where $W_A$ is equal to the weight of the compressible fluid:

$$Da = \frac{WmPaDg + W_A P_A Dg}{VmPaDg + Pg(Wm + W_A) - PgVmDg} \quad (14)$$

A suitable computer can be provided for solving this equation in the same manner as was done for the other pressure compensated embodiments of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an apparatus for controlling the density of a mixture of a liquid and a compressible substance which is moved through a processing system from the point of mixing said substance and liquid to a second point at which it is desired to maintain substantially a constant mixture density; means for introducing said substance into said liquid, a source of penetrative radiation mounted contiguous a point of passage of said mixture through said system so as to irradiate the mixture passing said point, a radiation detector mounted adjacent said point of passage for detecting radiation emanating from said mixture at said point, the pressure of said mixture in said system being different at said point of passage than at said second point, means actuated by said detector for controlling said means for introducing said substance in accordance with the density of said mixture at said point of passage, and means for compensating said controlling means for variation in pressure in said system at said point of passage to maintain a substantially constant density of said mixture at said second point.

2. In an apparatus for controlling the density of a mixture of a liquid and a compressible substance which is moved through a processing system from the point of mixing said substance and liquid to a second point at which it is desired to maintain substantially a constant mixture density; means for introducing said substance into said liquid, a source of penetrative radiation mounted contiguous a point of passage of said mixture through said system so as to irradiate the mixture passing said point, a radiation detector mounted adjacent said point of passage for detecting radiation emanating from said mixture at said point, the pressure of said mixture in said system being different at said point of passage than at said second point, means actuated by said detector for controlling said means for introducing said substance in accordance with the density of said mixture at said point of passage, and means for compensating said controlling means for variation in pressure in said system at said point of passage to maintain a substantially constant density of said mixture at said second point, said compensating means including means for compensating for a change in pressure at said point of passage and means for compensating for a change in pressure at said second point.

3. In an apparatus for controlling the density of a mixture of a liquid and a compressible substance which is moved through a processing system from the point of mixing said substance and liquid to a second point at which it is desired to maintain substantially a constant mixture density; means for introducing said substance into said liquid, a source of penetrative radiation mounted contiguous a point of passage of said mixture through said system so as to irradiate the mixture passing said point, a radiation detector mounted adjacent said point of passage for detecting radiation emanating from said mixture at said point, the pressure of said mixture in said system being different at said point of passage than at said second point, means actuated by said detector for controlling said means for introducing said substance in accordance with the density of said mixture at said point of passage, and means for compensating said controlling means for variation in pressure in said system at said point of passage to maintain a substantially constant density of said mixture at said second point, said compensating means comprising computer means having a first input which is a function of the pressure of said mixture at said point of passage and a second input which is a function of the pressure of said mixture at said second point.

4. A device as set out in claim 3 wherein said first and second inputs are supplied by pressure transducers.

5. A device as set out in claim 3 wherein the pressure of said mixture at said point of passage is higher than the pressure of said mixture at said second point and wherein said computer means transforms the signal from said detector from its value at said detector to the value it would have if the pressure at said point of passage was equal to the pressure at said second point.

6. A device as set out in claim 3 wherein said processing system transforms said mixture from a mixture of a liquid and a compressible substance at said point of mixing to an at least semi-solid liquid containing said compressible substance at said second point.

7. In an apparatus for controlling the density of a mixture of a liquid and a compressible substance which is moved through a processing system for at least semi-solidifying said liquid, means for introducing said substance into said processing system, said mixture entering said system as a liquid and compressible substance at the point of mixing said liquid and substance and being delivered at a second point as an at least semi-solidified liquid containing said substance, a source of penetrative radiation mounted contiguous a point of passage of said mixture in said system for irradiating the mixture passing by said point, a radiation detector mounted adjacent said point of passage for detecting radiation emanating from said mixture, means actuated by said detector for controlling said means for introducing said substance in accordance with the density of said mixture at said point of passage, and means for compensating said controlling means for variations in pressure in said system at said point of passage in order to maintain a substantially constant density at said second point.

8. In an apparatus for measuring the density of a mixture of a liquid and a compressible substance, conduit means through which said liquid passes, means for introducing said substance into said conduit means, a source of penetrative radiation mounted at one side of said conduit means, a radiation detector mounted at the other side of said conduit means adjacent said source for detecting radiation passing through said conduit means and said mixture therein, said source and said detector being so mounted that said radiation detected by said detector passes from said source to said detector substantially normal to said conduit means, said conduit means having a portion thereof at the point where said radiation passes through said conduit means wherein the wall of said conduit means has a different coefficient of absorption than the wall of said conduit means on either side of said portion, said detector providing a signal which is a function of the density of the mixture in said conduit means at said portion.

9. In an apparatus for controlling the density of a mixture of a liquid and a compressible substance, conduit means through which said liquid passes, means for introducing said substance into said conduit means, a source of penetrative radiation mounted at one side of said conduit means, a radiation detector mounted at the other side of said conduit means adjacent said source for detecting radiation passing through said conduit means and said mixture therein, said source and said detector being so mounted that said radiation detected by said detector passes from said source to said detector substantially normal to said conduit means, said conduit means having a portion thereof at the point where said radiation passes through said conduit means wherein the wall of said conduit means has a smaller thickness than the wall of said conduit means on either side of said portion, said detector providing a signal which is a function of the density of the mixture in said conduit means at said portion.

10. In an apparatus for controlling the density of a mixture of a liquid and a compressible substance, conduit means through which said liquid passes, means for introducing said substance into said conduit means, a source of penetrative radiation mounted at one side of said conduit means, a radiation detector mounted at the other side of said conduit means adjacent said source for detecting radiation passing through said conduit means and said mixture therein, said source and said detector being so mounted that said radiation detected by said detector passes from said source to said detector substantially normal to said conduit means, said conduit means having a portion of reduced diameter at the point where said radiation passes through said conduit means, said detector providing a signal which is a function of the density of the mixture in said conduit means at said portion.

11. In an apparatus for controlling the density of a mixture of a liquid and a compressible substance, conduit means through which said liquid passes, means for introducing said substance into said conduit means, a source of penetrative radiation mounted at one side of said conduit means, a radiation detector mounted at the other side of said conduit means adjacent said source for detecting radiation passing through said conduit means and said mixture therein, said source and said detector being so mounted that said radiation detected by said detector passes from said source to said detector substantially normal to said conduit means, said conduit means having a portion thereof at the point where said radiation passes therethrough wherein the wall of said conduit means has a different coefficient of absorption than the wall of said conduit means on either side of said portion, and means actuated by said detector for controlling said means for introducing said substance in accordance with the density of said mixture at said portion.

12. In an apparatus for controlling the density of a mixture of a liquid and a compressible substance, conduit means through which said liquid passes, means for introducing said substance into said conduit means, a source of penetrative radiation mounted at one side of said conduit means, a radiation detector mounted at the other side of said conduit means adjacent said source for detecting radiation passing through said conduit means and said mixture therein, said source and said detector being so mounted that said radiation detected by said detector passes from said source to said detector substantially normal to said conduit means, said conduit means having a portion thereof at the point where said radiation passes therethrough wherein the wall of said conduit means has a smaller thickness than the wall of said conduit means on either side of said portion, and means actuated by said detector for controlling said means for introducing said substance in accordance with the density of said mixture at said portion.

13. In an apparatus for controlling the density of a mixture of a liquid and a compressible substance; processing means for semi-solidifying said liquid, means for introducing said substance into said liquid, conduit means connected to said processing means and extending therefrom, a source of penetrative radiation mounted on one side of said conduit means, a radiation detector mounted on the other side of said conduit means adjacent said source for detecting radiation passing through said conduit means, said detector and source being mounted so that radiation reaching said detector travels substantially normal to said conduit means, said conduit means having a portion thereof at the point where said radiation passes through said conduit means wherein the wall of said conduit means has a different coefficient of absorption than the wall of said conduit means on either side of said portion, and means actuated by said detector for controlling said means for introducing said substance in accordance with the density of said mixture at the position of said detector.

14. In an apparatus for controlling the density of a mixture of a liquid and a compressible substance; processing means for semi-solidifying said liquid, means for introducing said substance into said liquid, conduit means connected to said processing means and extending therefrom, a source of penetrative radiation mounted on one side of said conduit means, a radiation detector mounted on the other side of said conduit means adjacent said source for detecting radiation passing through said conduit means, said detector and source being mounted so that radiation reaching said detector travels substantially normal to said conduit means, and means actuated by said detector for controlling said means for introducing said substance in accordance with the density of said mixture at the position of said detector.

15. In an apparatus for controlling the density of a mixture of a liquid and a compressible substance; processing means for semi-solidifying said liquid, means for introducing said substance into said liquid, conduit means connected to said processing means and extending therefrom, a source of penetrative radiation mounted at one side of said conduit means, a radiation detector mounted on the other side of said conduit means adjacent said source for detecting radiation passing through said conduit, and means actuated by said detector for controlling said means for introducing said substance in accordance with the density of said mixture passing said detector.

16. In an apparatus for controlling the density of a mixture of a liquid and a compressible substance, conduit means through which said liquid passes, means for introducing said substance into said conduit means, a source of penetrative radiation mounted at one side of said conduit means, a radiation detector mounted at the other side of said conduit means adjacent said source for detecting radiation passing through said conduit means and said mixture therein, said source and said detector being so mounted that said radiation detected by said detector passes from said source to said detector substantially normal to said conduit means, means enclosing said conduit means at the position of said source and detector for preventing the formation of condensate, said detector providing a signal which is a function of the density of the mixture in said conduit means at the position of said detector.

17. In an apparatus for controlling the density of a mixture of a liquid and a compressible substance; processing means for semi-solidifying said liquid, means for introducing said substance into said liquid, conduit means connected to said processing means and extending therefrom, a source of penetrative radiation mounted on one side of said conduit means, a radiation detector mounted on the other side of said conduit means adjacent said source for detecting radiation passing through said conduit, means enclosing said conduit means at the position of said source and detector for preventing the formation of condensate, and means actuated by said detector for controlling said means for introducing said substance in accordance with the density of the mixture passing said detector.

18. In an apparatus for controlling the density of a mixture of a liquid and a compressible substance; processing means for semi-solidifying said liquid, means for introducing said substance into said liquid, conduit means connected to said processing means and extending therefrom, a source of penetrative radiation mounted on one side of said conduit means, a radiation detector mounted on the other side of said conduit means adjacent said source for detecting radiation passing through said conduit, means enclosing said conduit means at the position of said source and detector for preventing the formation of condensate, said detector providing a signal which is the function of the density of the mixture in said conduit means at the position of said detector.

19. In an apparatus for controlling the density of a mixture of a liquid and a compressible substance; processing means for semi-solidifying said liquid, means for introducing said substance into said liquid, conduit means connected to said processing means and extending therefrom, a source of penetrative radiation mounted on one side of said conduit means, a radiation detector mounted on the other side of said conduit means adjacent said source for detecting radiation passing through said conduit, said source and detector being mounted so that radiation reaching said detector travels substantially normal to said conduit means, means enclosing and hermetically sealing said conduit means at the position of said source and detector for preventing the formation of condensate, and means actuated by said detector for controlling said means for introducing said substance in accordance with the density of the mixture passing said detector.

20. A device as set out in claim 19 wherein said enclosing means is a container which encloses at least portions of said source and detector.

21. A device as set out in claim 19 wherein said enclosing means is a container which completely encloses said source and detector.

22. In an apparatus for controlling the density of a mixture of a liquid and a compressible substance; processing means for semi-solidifying said liquid, means for introducing said substance into said liquid, conduit means connected to said processing means and extending therefrom, a source of penetrative radiation mounted on one side of said conduit means, a radiation detector mounted on the other side of said means conduit means adjacent said source for detecting radiation passing through said conduit, said source and said detector being mounted so that radiation reaching said detector travels substantially normal to said conduit means, said conduit means having a reduced absorption coefficient portion opposite said source and detector and in the path of said radiation, means actuated by said detector for controlling said means for introducing said substance in accordance with the density of said mixture at the position of said detector, and means for compensating said controlling means for variations in pressure in said conduit means at the position of said detector.

23. In an apparatus for controlling the density of a mixture of a liquid and a compressible substance; processing means for semi-solidifying said liquid, means for introducing said substance into said liquid, conduit means connected to said processing means and extending therefrom, a source of penetrative radiation mounted on one side of said conduit means, a radiation detector mounted on the other side of said conduit means adjacent said source for detecting radiation passing through said conduit means, said source and said detector being mounted so that radiation reaching said detector travels substantially normal to said conduit means, means enclosing said conduit means at the position of said source and detector for preventing the formation of condensate, means actuated by said detector for controlling said means for introducing said substance in accordance with the density of said mixture passing said detector, and means for compensating said controlling means for variations in pressure in said conduit means at the position of said detector.

24. In an apparatus for controlling the density of a mixture of a liquid and a compressible substance; processing means for semi-solidifying said liquid, means for introducing said substance into said liquid, conduit means connected to said processing means and extending therefrom, a source of penetrative radiation mounted on one side of said conduit means, a radiation detector mounted on the other side of said conduit means adjacent said source for detecting radiation passing through said conduit, said source and detector being mounted so that radiation reaching said detector travels substantially normal to said conduit means, said conduit means having a reduced diameter portion opposite said source and detector and in the path of said radiation, means enclosing said conduit means at the position of said source and detector for preventing the formation of condensate, means actuated by said detector for controlling said means for introducing said substance in accordance with the density of the mixture passing said detector, and means for compensating said controlling means for variations in pressure in said conduit means at the position of said detector.

25. In a control system for a banked freezer ice cream plant; a plurality of ice cream freezers, means for supplying air to each of said freezers, ice cream outlet conduit means on each freezer, a common outlet conduit means connecting said freezer outlet conduit means to a discharge point, a source of penetrative radiation mounted adjacent one side of said common outlet conduit means, a radiation detector mounted on the other side of said common outlet conduit means adjacent said source for detecting radiation passing through said common outlet conduit means, the action of said detector being controlled by the density of said ice cream passing through said common outlet conduit and means actuated by said detector for controlling said means for supplying air to at least one of said freezers to maintain a constant density of ice cream issuing from said common outlet conduit means at said point of discharge.

26. In a control system for a banked freezer ice cream plant, a plurality of ice cream freezers, means for supplying air to each of said freezers, ice cream outlet conduit means on each freezer, a common outlet conduit means connecting said freezer outlet conduit means to a discharge point, a source of penetrative radiation mounted adjacent one side of said common outlet conduit means, a radiation detector mounted on the other side of said common outlet conduit means adjacent said source for detecting radiation passing through said common outlet conduit means, the action of said detector being controlled by the density of said ice cream passing through said common outlet conduit and means actuated by said detector for controlling said means for supplying air to at least one of said freezers to maintain a constant density of ice cream issuing from said common outlet conduit means at said point of discharge.

27. In a control system for a banked freezer ice cream plant; a plurality of ice cream freezers, means for supplying air to each of said freezers, ice cream outlet conduit means on each freezer, a common outlet conduit means connecting said freezer outlet conduit means to a discharge point, a source of penetrative radiation mounted adjacent one side of said common outlet conduit means substantially at said discharge point, a radiation detector mounted on the other side of said common outlet conduit means adjacent said source for detecting radiation passing through said common outlet conduit means, the action of said detector being controlled by the density of said ice cream passing through said common outlet conduit and means actuated by said detector for controlling said means for supplying air to at least one of said freezers to maintain a constant density of ice cream issuing from said common outlet conduit means at said point of discharge.

28. In a control system for a banked freezer ice cream plant; a plurality of ice cream freezers, means for supplying air to each of said freezers, ice cream outlet conduit means on each freezer, a common outlet conduit means connecting said freezer outlet conduit means to a discharge point, a source of penetrative radiation mounted adjacent one side of said common outlet conduit means, a radiation detector mounted on the other side of said common outlet conduit means adjacent said source for detecting radiation passing through said common outlet conduit means, the action of said detector being controlled by the density of said ice cream passing through said common outlet conduit and means actuated by said detector for controlling the means for supplying air to each of said freezers to maintain a constant density of ice cream issuing from said common outlet conduit means at said point of discharge.

29. In a control system for a banked freezer ice cream plant; a plurality of ice cream freezers, means for supplying air to each of said freezers, ice cream outlet conduit means on each freezer, a common outlet conduit means connecting said freezer outlet conduit means to a discharge point, a source of penetrative radiation mounted adjacent one side of said common outlet conduit means substantially at said discharge point, a radiation detector mounted on the other side of said common outlet conduit means adjacent said source for detecting radiation passing through said common outlet conduit means, the action of said detector being controlled by the density of said ice cream passing through said common outlet conduit and means actuated by said detector for controlling the means for supplying air to each of said freezers to maintain a constant density of ice cream issuing from said common outlet conduit means at said point of discharge.

30. A control system as set out in claim 29 wherein said means actuated by said detector for controlling the supply of air to each of said freezers includes proportioning means for proportioning the amount of control supplied to the air supply to each freezer.

References Cited in the file of this patent

UNITED STATES PATENTS

| | | |
|---|---|---|
| 1,965,616 | Vogt | July 10, 1934 |
| 2,501,174 | Herzog | Mar. 21, 1950 |
| 2,530,981 | Mikina | Nov. 21, 1950 |
| 2,565,121 | Clardy | Aug. 21, 1951 |
| 2,763,789 | Ohmart | Sept. 18, 1956 |
| 2,773,349 | Bollo et al. | Dec. 11, 1956 |